United States Patent
Mikan et al.

(10) Patent No.: US 9,841,757 B2
(45) Date of Patent: Dec. 12, 2017

(54) DRONE PIGGYBACKING ON VEHICLES

(71) Applicants: AT&T INTELLECTUAL PROPERTY I, L.P., Atlanta, GA (US); AT&T Mobility II LLC, Atlanta, GA (US)

(72) Inventors: Jeffrey Mikan, Atlanta, GA (US); Fulvio Cenciarelli, Suwanee, GA (US); John P. Davis, III, Marietta, GA (US); Quinn Aguirre, Duluth, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 189 days.

(21) Appl. No.: 14/958,408

(22) Filed: Dec. 3, 2015

(65) Prior Publication Data

US 2017/0160735 A1    Jun. 8, 2017

(51) Int. Cl.
*G05D 1/00* (2006.01)
*G05D 1/10* (2006.01)
(Continued)

(52) U.S. Cl.
CPC ......... *G05D 1/0005* (2013.01); *B64C 39/024* (2013.01); *G05D 1/0011* (2013.01);
(Continued)

(58) Field of Classification Search
CPC .... G05D 1/0005; G05D 1/0011; G05D 1/101; G08G 5/0034; B64C 39/024; B64C 2201/128
See application file for complete search history.

(56) References Cited

U.S. PATENT DOCUMENTS 7,085,775 B2    8/2006  Short et al.
7,225,981 B2    6/2007  Jongebloed
(Continued)

FOREIGN PATENT DOCUMENTS

WO      02062663       8/2002
WO    2013052178       4/2013
WO    2014102437       7/2014

OTHER PUBLICATIONS

Ackerman, "The Way to Make Delivery Drones Work Is Using . . . Trucks?" IEEE Spectrum, spectrum.ieee.org, Feb. 24, 2015. http://spectrum.ieee.org/automaton/robotics/aerial-robots/amp-electric-truck-delivery-drones.

(Continued)

*Primary Examiner* — Richard M Camby
(74) *Attorney, Agent, or Firm* — Haynes and Boone, LLP

(57) ABSTRACT

A system for providing drone piggybacking on vehicles is disclosed. In particular, the system may enable drones or other unmanned mobile connected devices to piggyback onto various types of hosts, such as vehicles, in a symbiotic fashion. Through the symbiotic relationship created between the drones and hosts, the drones may utilize the hosts as a means for transport, such as while delivering a good to an intended destination, and the hosts may receive certain incentives in exchange for transporting the drones. Drones may be paired with hosts based on any number of factors, such as whether the host is traveling on a route that corresponds with reaching the intended destination, whether the host is capable of recharging the drone, and whether the drone has sufficient power to reach the intended destination. By enabling drones to piggyback with hosts, the required traveling range for a drone may be reduced.

20 Claims, 5 Drawing Sheets

(51) Int. Cl.
  *B64C 39/02* (2006.01)
  *G08G 5/00* (2006.01)
(52) U.S. Cl.
  CPC ........... *G05D 1/101* (2013.01); *G08G 5/0034* (2013.01); *B64C 2201/128* (2013.01)

(56) References Cited

U.S. PATENT DOCUMENTS

| | | | |
|---|---|---|---|
| 7,251,612 | B1 | 7/2007 | Parker et al. |
| 7,665,691 | B2 | 2/2010 | Hanzlick et al. |
| 8,358,677 | B2 | 1/2013 | Collette et al. |
| 8,401,790 | B2 | 3/2013 | Eisele et al. |
| 8,788,121 | B2 | 7/2014 | Klinger |
| 8,914,182 | B2 | 12/2014 | Casado et al. |
| 8,924,312 | B2 | 12/2014 | Kadaba |
| 9,022,324 | B1 | 5/2015 | Abhyanker |
| 9,044,543 | B2 | 6/2015 | Levien et al. |
| 9,056,676 | B1 | 6/2015 | Wang |
| 9,070,101 | B2 | 6/2015 | Abhyanker |
| 2009/0314883 | A1 | 12/2009 | Arlton et al. |
| 2012/0226394 | A1 | 9/2012 | Marcus |
| 2013/0134254 | A1 | 5/2013 | Moore |
| 2014/0032034 | A1 | 1/2014 | Raptopoulos et al. |
| 2014/0124621 | A1 | 5/2014 | Godzdanker et al. |
| 2014/0252162 | A1 | 9/2014 | Teller |
| 2014/0330456 | A1 | 11/2014 | Lopez et al. |
| 2015/0102154 | A1 | 4/2015 | Duncan et al. |
| 2015/0120094 | A1 | 4/2015 | Kimchi et al. |
| 2015/0129716 | A1 | 5/2015 | Yoffe |
| 2015/0154532 | A1 | 6/2015 | Skaaksrud et al. |
| 2015/0370251 | A1* | 12/2015 | Siegel ................. G05D 1/0027 701/2 |
| 2016/0347452 | A1* | 12/2016 | Stanek ................... B60R 16/02 |
| 2017/0011340 | A1* | 1/2017 | Gabbai ............. G06Q 10/0836 |
| 2017/0139421 | A1* | 5/2017 | Lockwood ........... G05D 1/0276 |

OTHER PUBLICATIONS

Stark Aerospace, "Tactical Tethered Hovering Aerial ISR System," starkaerospace.com, Model: Hoverlite, 2014. http://starkaerospace.com/wp-content/uploads/2014/10/HoverLiteX.pdf.

Souppouris, "Renault concept car launches drone to check for gridlock ahead," The Verge, theverge.com, 2014. http://www.theverge.com/2014/2/7/5389114/renault-kwid-drone-car-concept.

Welch, "A cost-benefit analysis of Amazon Prime Air," University of Tennessee at Chattanooga, UTC Scholar, utc.edu, Mar. 16, 2015. http://scholar.utc.edu/cgi/viewcontent.cgi?article=1051&context=honors-theses.

Flytex, "Flytrex Sky the internet drone—designed to deliver," flytrex.com, Accessed Sep. 3, 2015. http://www.flytrex.com/shop/flytrex-sky-internet-drone/.

Lavars, "New control method enables drones to land autonomously on moving vehicles" Gizmag, gizmag.com, Aug. 20, 2014. http://www.gizmag.com/control-method-drones-autonomous-docking-moving-vehicles/33448/.

* cited by examiner

DRONE PIGGYBACKING ON VEHICLES

FIELD OF THE INVENTION

The present application relates to route-optimization technologies, drone technologies, and device management technologies, and more particularly, to a system and method for providing drone piggybacking on vehicles.

BACKGROUND

In today's society, users are increasingly utilizing network and other service providers to gain access to the Internet, purchases products and services, access software services, request and receive various types of content, access software applications, and perform a variety of other tasks and functions. As such users have become increasingly comfortable with technology in terms of performing their daily tasks, such users have begun to demand and require faster and more efficient access to the goods and services that they purchase. In order to meet such demands and requirements, companies have provided faster and more efficient access to such goods and services through the use of various customized types of applications, such as mobile applications that execute directly on smartphone devices or other mobile devices. Additionally, an increasing number of companies are contemplating the use of drones to deliver ordered goods to users to further enhance the delivery experience for users.

While the use of drones may assist with alleviating certain bottlenecks that occur in various types of delivery processes, current drone technologies still have many shortcomings. For example, current versions of drones often have very limited battery life, utilize heavy batteries, and have limited cargo-carrying capacity. Additionally, current versions of drones often require increasing the weight of the battery in order to increase the traveling range for the drones. While heavier batteries assist with increasing the traveling range for the drone, the heavier batteries also reduce the drone's carrying capacity. Also, current techniques utilized for optimizing a drone's movement so as to maximize drone range and battery life may reduce the speed at which the drone operates. As a result, current methodologies and technologies associated with drones may be modified so as to provide enhanced quality-of-service for users and companies. Such enhancements and improvements to methodologies and technologies may provide for improved customer satisfaction, increased revenue for companies, and increased savings.

SUMMARY

A system and accompanying methods for providing drone piggybacking on host vehicles are disclosed. In particular, the system and methods may include enabling drones and/or other unmanned mobile connected objects to piggyback onto various types of hosts, such as, but not limited to, vehicles, in a symbiotic fashion. Through the symbiotic relationship created between the drones and hosts, the drones may utilize the hosts as a means for transport, such as while delivering an ordered good to an intended destination, and the hosts may receive certain incentives in exchange for transporting the drones. As a result, the range of a drone may be effectively increased when the drone is able to piggyback with a host for at least a portion of the distance between two endpoints. In order to accomplish the foregoing, the system and methods may include receiving information associated with an object to be delivered to an intended destination. For example, the information may include, but is not limited to, an identification of the object, the object's dimensions, the object's weight, an identification of the intended destination that the object is to be delivered to, and a time for delivering the object to the intended destination. Based on such information, the systems and methods may include calculating a first route for the drone to deliver the object to the intended destination. Once the first route is calculated, the systems and methods may include transmitting instructions to cause the drone to initiate delivery of the object by using the first route.

The systems and methods may also include determining whether a portion of a second route associated with a host vehicle corresponds with reaching the intended destination for delivering the object. For example, if the portion of the second route overlaps with a portion of the first route, the second route associated with the host vehicle may correspond with reaching the intended destination. As another example, if the portion of the second route provides an alternative route for reaching the intended destination, then the second route associated with the host vehicle may correspond with reaching the intended destination. If the portion of the second route associated with the host vehicle corresponds with reaching the intended destination, the systems and methods may include causing the drone to piggyback with the host vehicle during the portion of the second route. Based on the drone piggybacking with the host vehicle during the portion of the second route, the drone may proceed to deliver the object to the intended destination.

In certain embodiments, the drone may be configured to recharge a power source of the drone while piggybacking on a host vehicle. For example, the drone may recharge the drone's battery by connecting to the host vehicle's power supply before departing to the drone's intended destination. Additionally, the systems and methods may be configured to enable the drone to piggyback on any number of host vehicles while on its way to the intended destination. Furthermore, the systems and methods may enable the drone to dock at drone nesting locations to recharge, refuel, conserve energy, or a combination thereof. Notably, the functionality provided by the systems and methods allow for the reduction in the amount of range needed for a drone, allow for the reduction in drone battery sizes, allow for cheaper drones to be manufactured, and allow for smaller drones to be utilized. Moreover, the systems and methods enable sellers of goods to have the opportunity to suggestively sell items of interest in an instant gratification model, enable sellers to partner with various delivery channels based on location, enable sellers and couriers to use predicted deliveries to help better plan efficient vehicle routes, enable more efficient deliveries to third parties who share their current and predicted future location information, or a combination thereof.

In one embodiment, a system for providing drone piggybacking on host vehicles is disclosed. The system may include a memory that stores instructions and a processor that executes the instructions to perform various operations of the system. The system may perform an operation that includes receiving information associated with an object to be delivered to an intended destination. Based on the information received, the system may include performing an operation that includes calculating a first route for a drone to deliver the object to the intended destination. The system may then perform an operation that includes initiating, by utilizing the drone, the delivery of the object to the intended destination using the first route. The system may also perform an operation that includes determining whether a portion of a second route associated with a host vehicle corresponds with reaching the intended destination. If the portion of the second route associated with the host vehicle corresponds with reaching the intended destination, the system may perform an operation that includes causing the drone to piggyback with the host vehicle during the portion of the second route. Finally, the system may perform an operation that includes delivering, based on the drone piggybacking with the host vehicle during the portion of the second route, the object to the intended destination.

In another embodiment, a method for providing drone piggybacking on vehicles is disclosed. The method may include utilizing a memory that stores instructions, and a processor that executes the instructions to perform the various functions of the method. In particular, the method may include receiving information associated with an object to be delivered to an intended destination. Additionally, the method may include determining, based on the information, a first route for a drone to deliver the object to the intended destination. The method may proceed to include initiating, by utilizing the drone, delivery of the object to the intended destination using the first route. Also, the method may include determining whether a portion of a second route associated with a host vehicle overlaps with a corresponding portion of the first route. If the portion of the second route associated with the host vehicle is determined to overlap with the corresponding portion of the first route, the method may include causing the drone to piggyback with the host vehicle during the portion of the second route. Finally, the method may include delivering, based on the drone piggybacking with the host vehicle during the portion of the second route, the object to the intended destination.

According to yet another embodiment, a computer-readable device having instructions for providing drone piggybacking on vehicles is provided. The computer instructions, which when loaded and executed by a processor, may cause the processor to perform operations including: calculating, based on information received for an object, a first route for a drone to deliver the object to an intended destination; initiating, by utilizing the drone, delivery of the object to the intended destination using the first route; determining whether a portion of a second route associated with a host vehicle corresponds with reaching the intended destination; causing, if the portion of the second route associated with the host vehicle corresponds with reaching the intended destination, the drone to piggyback with the host vehicle during the portion of the second route; and delivering, based on the drone piggybacking with the host vehicle during the portion of the second route, the object to the intended destination.

These and other features of the systems and methods for providing drone piggybacking on vehicles are described in the following detailed description, drawings, and appended claims.

DETAILED DESCRIPTION OF THE INVENTION

Figure 1:
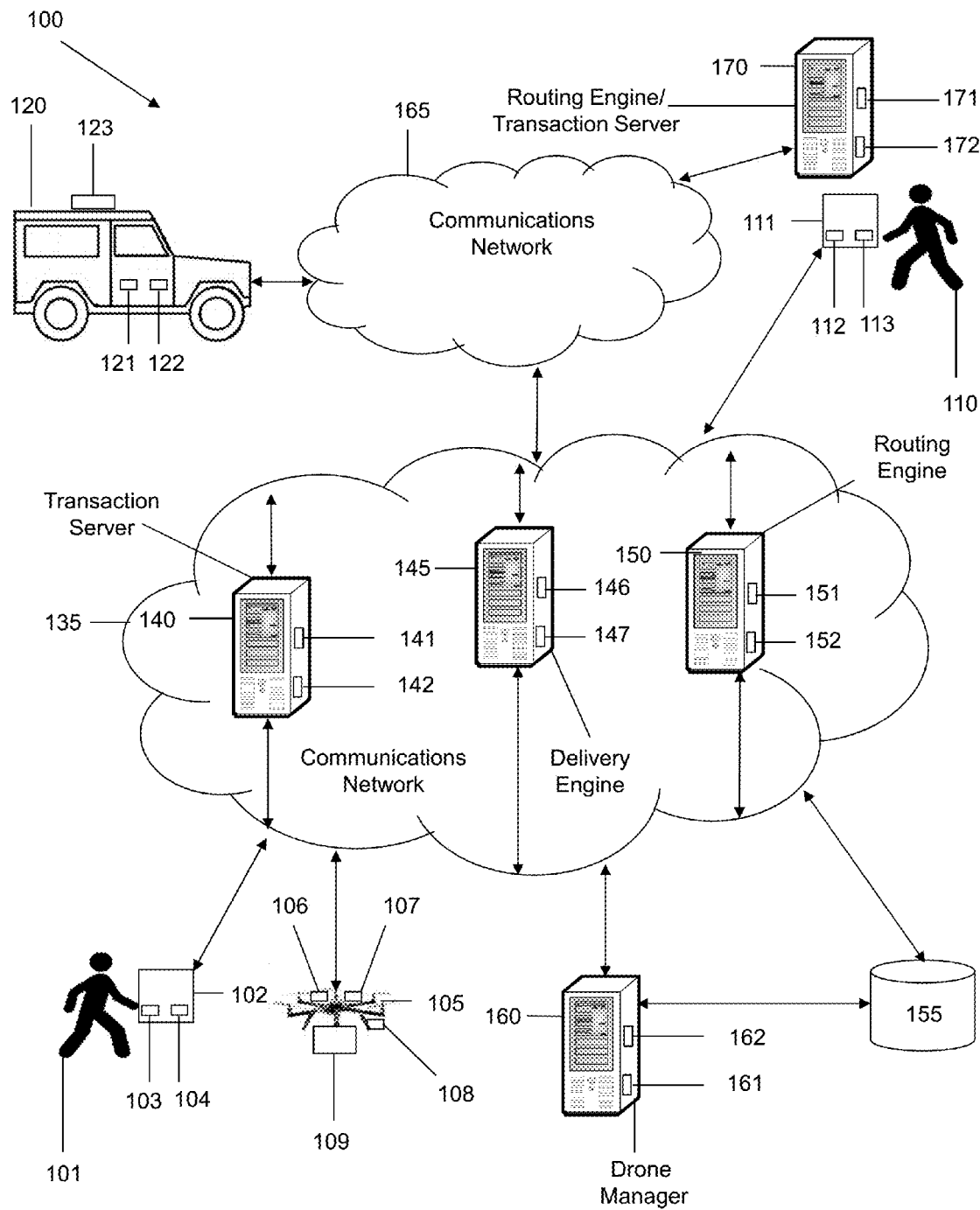
FIG. 1 is a schematic diagram of a system for providing drone piggybacking on host vehicles according to an embodiment of the present disclosure.

A system 100 and accompanying methods for providing drone piggybacking on host vehicles 120 are disclosed. In particular, the system 100 and methods may include enabling drones 105 and/or other unmanned mobile connected objects to piggyback onto various types of hosts, such as, but not limited to, vehicles in a symbiotic fashion. Based on the symbiotic relationship created between the drones 105 and host vehicles 120, the drones 105 may utilize the host vehicles 120 as a means for transport, such as while delivering a good to an intended destination 185. In certain embodiments, the host vehicles 120 may receive certain incentives in exchange for transporting the drones 105 on their way to the intended destination 185. In order to accomplish the foregoing, the system 100 and methods may include receiving information associated with an object 109 to be delivered to an intended destination 185. For example, the information may include, but is not limited to, an identification of the object 109, the object's 109 dimensions, the object's 109 weight, an identification of the intended destination 185 that the object 109 is to be delivered to, and a time for delivering the object 109 to the intended destination 185. Based on such information, the system 100 and methods may include calculating a first route for the drone 105 to deliver the object 109 to the intended destination 185. Once the first route is calculated, the system 100 and methods may include transmitting instructions to cause the drone 105 to depart from a departure location 180 and begin delivering the object 109 using the first route.

The system 100 and methods may also include determining whether a portion of a second route associated with a host vehicle 120 corresponds with reaching the intended destination 185 for delivering the object 109. As a first example, if the portion of the second route overlaps with a portion of the first route, the second route associated with the host vehicle 120 may correspond with reaching the intended destination 185. As a second example, if the portion of the second route provides an alternate route for reaching the intended destination 185, then the second route associated with the host vehicle 120 may correspond with reaching the intended destination 185. If the portion of the second route associated with the host vehicle 120 corresponds with reaching the intended destination 185, the system 100 and methods may include causing the drone 105 to piggyback with the host vehicle 120 during the portion of the second route. Based on the drone 105 piggybacking with the host vehicle 120 during the portion of the second route, the drone 105 may proceed to deliver the object 109 to the intended destination 185.

In certain embodiments, the drone 105 may be configured to recharge a power source 108 of the drone 105 while piggybacking on a host vehicle 120. For example, the drone 105 may recharge the drone's 105 battery by connecting to the host vehicle's 120 power supply 123 while on its way to the intended destination 185. Additionally, the system 100 and methods may be configured to enable the drone 105 to piggyback on any number of host vehicles 120 while on its way to the intended destination 185. Also, the system 100 and methods may enable the drone 105 to dock at drone nesting locations 190 to recharge, refuel, conserve energy, receive further instructions, pick up different objects, or a combination thereof. Notably, the functionality provided by the system 100 and methods allow for the reduction in the amount of range needed for a drone 105, allow for the reduction in drone battery sizes, allow for cheaper drones 105 to be manufactured, and allow for smaller drones 105 to be utilized. Moreover, the system 100 and methods enable sellers of goods to have the opportunity to suggestively sell items of interest using an instant gratification model, enable sellers to partner with various delivery channels based on location, enable sellers and couriers to use predicted deliveries to help better plan efficient vehicle routes, enable more efficient deliveries to third parties who share their current and predicted future location information, or any combination thereof.

Figure 2:
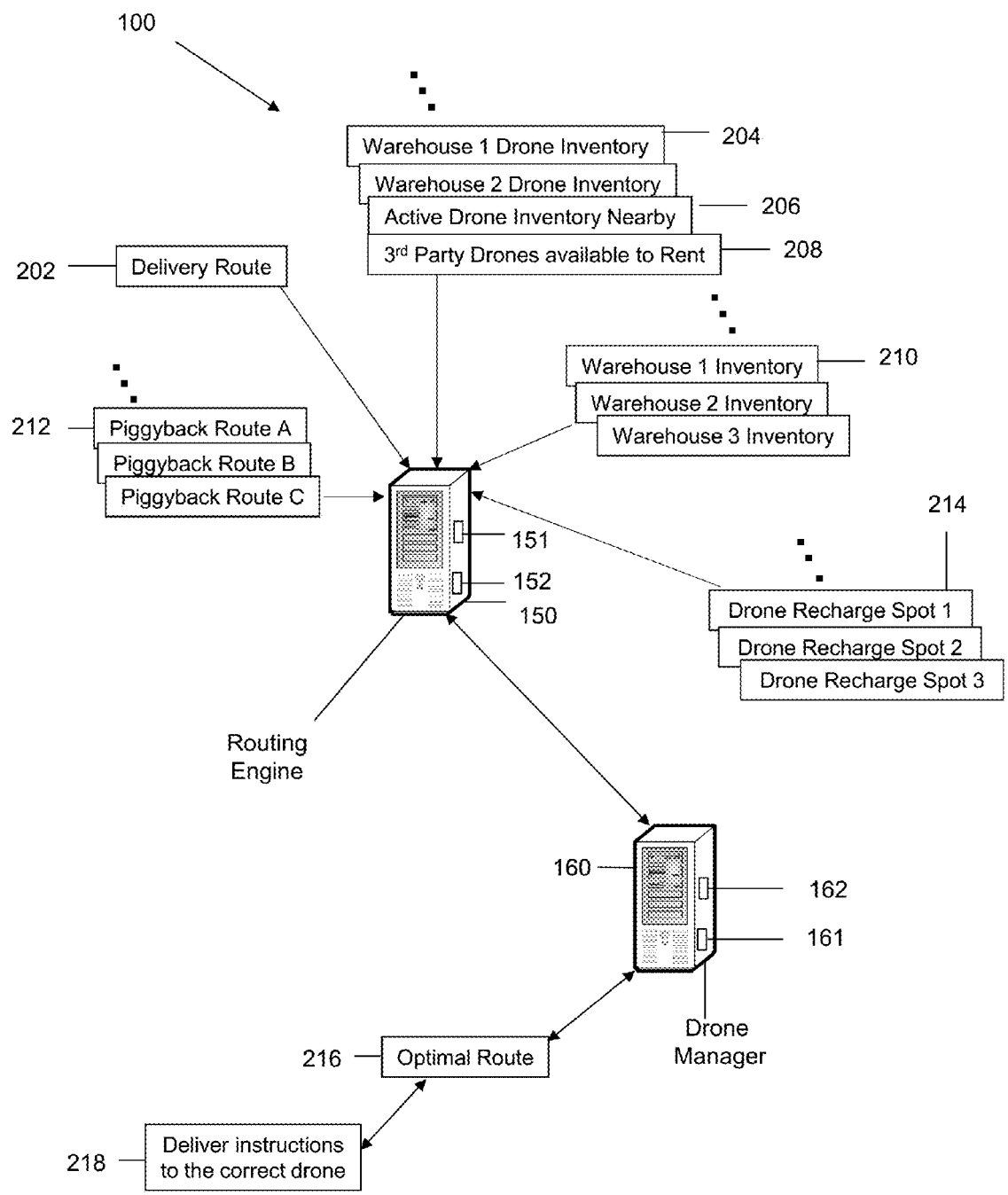
FIG. 2 is a schematic diagram illustrating further components, features, and parameters of the system of FIG. 1.
Figure 3:
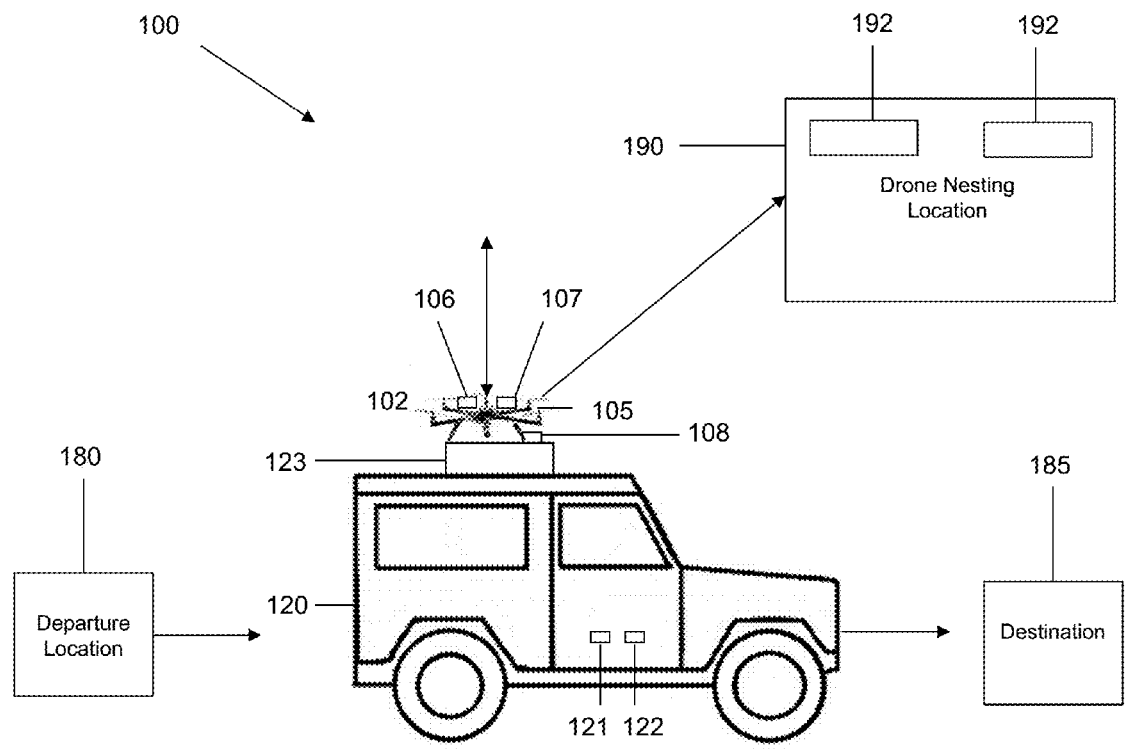
FIG. 3 is a schematic diagram illustrating a drone piggybacking on a host vehicle while delivering an object to a destination.

As shown in FIGS. 1-3, a system 100 for providing drone piggybacking on host vehicles 120 is disclosed. The system 100 may be configured to support, but is not limited to supporting, content delivery services, cloud computing services, IP Multimedia Subsystem (IMS) services, satellite services, telephone services, voice-over-internet protocol services (VoIP), voice-over-long-term-evolution (VoLTE) services, software as a service (SaaS) applications, gaming applications and services, social media applications and services, operations management applications and services, productivity applications and services, mobile applications and services, and any other computing applications and services. The system may include a first user 101, who may utilize a first user device 102 to access data, content, and services, or to perform a variety of other tasks and functions. As an example, the first user 101 may utilize first user device 102 to transmit signals to access various online services and content, such as those provided by a content provider or service provider associated with communications network 135. As another example, the first user 101 may utilize first user device 102 to make one or more online orders for goods and services from an online portal hosted by the communications network 135. In certain embodiments, the first user 101 may be a subscriber of a service provider that controls communications network 135. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. In certain embodiments, the first user device 102 may be a computer, a laptop, a set-top-box, a tablet device, a phablet, a server, a mobile device, a smartphone, a smart watch, or any other type of computing device. Illustratively, the first user device 102 is shown as a smartphone device in FIG. 1.

In addition to the first user 101, the system 100 may also include a second user 110, who may utilize a second user device 111 to perform a variety of functions. For example, the second user device 111 may be utilized by the second user 110 to transmit signals to request various types of content, services, and data provided by content and service providers associated with the communications network 135 or any other network in the system 100. Also, the second user 110 may utilize second user device 111 to make one or more online orders for goods and services from an online portal hosted by the communications network 135. In certain embodiments, the second user 110 may be a subscriber of a service provider that controls communications network 135. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. Similar to the first user device 102, in certain embodiments, the second user device 111 may be a computer, a laptop, a tablet device, a phablet, a server, a mobile device, a smartphone, a smart watch, or any other type of computing device. Illustratively, the second user device 111 is shown as a computer in FIG. 1.

In certain embodiments, the first user device 102 and the second user device 111 may have any number of software applications and/or application services stored and/or accessible thereon. For example, the first and second user devices 102, 111 may include cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with the any device in the system 100, any network in the system 100, or any combination thereof. In certain embodiments, the first user device 102 and the second user device 111 may include associated telephone numbers, device identities, or any other identifiers to uniquely identify the first and second user devices 102, 111.

The system 100 may include one or more drones 105, which may be any type of mobile connected device, such as, but not limited to, an unmanned mobile connected device. In certain embodiments, the drone 105 may be an unmanned aerial vehicle capable of flying to and from various destinations. For example, the drone 105 may be capable of flying from a departure location 180 to an intended destination 185 and back to the departure location 180. In certain embodiments, the drone 105 may be an unmanned terrestrial vehicle that is capable of traversing various types of land-based environments. The drone 105 may include a memory 106 that includes instructions, and a processor 107 that executes the instructions from the memory 106 to perform the various operations that are performed by the drone 105. In certain embodiments, the processor 107 may be hardware, software, or a combination thereof. The drone 105 may also include a power source 108, which may be any type of power source including, but not limited to, a battery, a solar-powered power source, an electric power source, a magnetic-based power source, an inductive-based power source, any type of power source, or any combination thereof.

In certain embodiments, the drone 105 may be configured to carry one or more objects 109, which may be any type of object. For example, the object 109 may be a product ordered by the first user 101 or the second user 111, such as via an online portal for a company selling the product. Information relating to an order for the product may transmitted to the drone 105, such as by server 140 (i.e. transaction server) of the communications network 135. Such information may include, but is not limited to, the type of product being ordered (e.g. object 109), the size of the product, the weight of the product, the expected delivery time for the product, the method of payment for paying for the product, information identifying the user that ordered the product, information identifying the intended destination 185, any order information, any product information, or any combination thereof. The objects 109 may be picked up by the drone 105 from a departure location 180 and may be delivered to the first user 101 or the second user 111, who may be located at intended destination 185. Various routes to and from the departure location 180 and the intended destination 185 may be determined by utilizing the server 150 (i.e. routing engine) and the server 160 (i.e. drone manager), and the routes may be transmitted from the servers 150, 160 to the drone 105 so that the drone 105 may have the appropriate route information for delivering the object 109 to the intended destination 185. In certain embodiments, the drone 105 may be configured to dock at one or more drone nesting locations 190, which may include any number of charging ports 192 that may be configured to charge the power source 108 of the drone 105 when the drone 105 is docked at the drone nesting location 190.

The system 100 may include a host vehicle 120, which may be any type of mobile connected device, such as an unmanned mobile connected vehicle (e.g. autonomous vehicle), a passenger vehicle, or a combination thereof. In certain embodiments, the system 100 may include any number of host vehicles 120, and the host vehicle 120 may be a car, a truck, a train, a plane, a boat, a ship, a trolley, a motorcycle, a bike, any type of vehicle, any type of moving device, or any combination thereof. The host vehicle 120 may include a memory 121 that includes instructions, and a processor 122 that executes the instructions from the memory 121 to perform the various operations that are performed by the host vehicle 120. In certain embodiments, the processor 122 may be hardware, software, or a combination thereof. Any routes that the host vehicle 120 is taking, will be taking, or is able to take may be determined and/or calculated by utilizing the server 170, which may be a routing engine/transaction server that is operated by a company or person that owns and/or controls the host vehicle 120. Routing information associated with the routes for the host vehicle 120 may be transmitted by the server 170 to the servers 145, 150, and 160, and may be shared with any device in the system 100, including the drone 105.

The host vehicle 120 may also include a dock 123, which may be configured to connect with and/or attach to a drone 105, such as when transporting the drone 105 to the intended destination 185 or to any other location. In certain embodiments, the drone 105 may be configured to land on the dock 123 so that the drone 105 may save battery power while on its way to the intended destination 185. When the drone 105 is attached and/or connected to the host vehicle 120, the drone 105 may be piggybacking with the host vehicle 120. In certain embodiments, the drone 105 may be piggybacking with the host vehicle 120 when the drone 105 is inside the host vehicle 120, such as in a storage compartment of the host vehicle 120. In certain embodiments, the drone 105 may be piggybacking with the host vehicle 120 when the drone 105 is anywhere on the host vehicle 120. In certain embodiments, the dock 123 may include any number and/or types of power supplies so as to enable the host vehicle 120 to recharge the power source 108 of the drone 105 when the drone 105 is piggybacking with the host vehicle 120. For example, if the power source 108 of the drone 105 is a battery, the dock 123 may include a power supply and/or charging device that may connect with the battery of the drone 105 so as to recharge the battery of the drone 105. Notably, any types of recharging mechanisms may be incorporated on the host vehicle 120 depending on the type of power source 108 utilized by the drone 105. For example, the host vehicle 120 may include, but is not limited to including, inductive connectors, magnetic connectors/chargers, lightning ports, universal serial bus ports capable of charging (e.g. USB Type-C), solar-based charging technologies, any type of charging technology, electrical charging sockets, or a combination thereof. In certain embodiments, the dock 123 may contain fuel that may be utilized to refuel a fuel tank of the drone 105.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. In certain embodiments, the communications network 135 may be subscribed to by a company, the first and second users 101, 110, or a combination thereof. The communications network 135 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. Illustratively, servers 140, 145, and 150 are shown as being included within communications network 135. In certain embodiments, the server 140 may serve as a transaction server for processing transactions (e.g. product orders) for the system 100, the server 145 may serve as a delivery engine for determining delivery details associated with the delivery of an object 109, and server 150 may serve as a routing engine for obtaining routing information and determining routes for delivering objects 109 in the system 100. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, 160, and 170. As mentioned above, servers 140, 145, and 150 may serve as a transaction server, delivery engine, and routing engine respectively. The servers 140, 145, and 150 may reside in communications network 135, however, in certain embodiments, the servers 140, 145, 150 may reside outside communications network 135. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 160, and 170 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, the communications network 165, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, the communications network 165, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to the drone 105, the host vehicle 120, the servers 140, 145, 150, 160, 170, the first user device 102, the second user device 111, any devices in the system 100, any other device, any network, or any combination thereof.

The database 155 may also store information and metadata obtained from the system 100, store metadata and other information associated with the first and second users 101, 110, store user profiles associated with the first and second users 101, 110, store device profiles associated with any device in the system 100, store communications traversing the system 100, store user preferences, store information associated with any device or signal in the system 100, store information relating to patterns of usage relating to the first and second user devices 102, 111, store any information obtained from any of the networks in the system 100, store historical data associated with the first and second users 101, 110, store device characteristics, store history information for various types of items, products and services, store user purchase history information, store information relating to any devices associated with the first and second users 101, 110, store information associated with orders made in the system 100, store any information associated with the drone 105, store inventory information associated with drones 105, store inventory information associated with objects 109, store delivery information associated with an order, store any information associated with the object 109, store information relating to different types of recharging technologies, store rerouting cost information, store information relating to limits on rerouting a route for a drone 105, store drone 105 battery information, store information relating to the host vehicles 120, store any type of routing information, store optimal route calculation information, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

In addition to communications network 135, the system 100 may also include a communications network 165. In certain embodiments, the communications network 165 may be controlled by a third party service provider, a company, or even the service provider of the communications network 135. For example, in an embodiment, the communications network 165 may be operated by a company that controls host vehicle 120, determines routes for host vehicle 120, conducts transactions associated with host vehicle 120, or a combination thereof. In certain embodiments, the communications network 165 of the system 100 may be configured to link each of the devices in the system 100 to one another. Additionally, the communications network 165 may be configured to transmit, generate, and receive any information and data traversing the system 100. In certain embodiments, the communications network 165 may include any number of servers, databases, or other componentry. In certain embodiments, the communications network 165 may be subscribed to by a company, the first and second users 101, 110, or a combination thereof. The communications network 165 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network, or any combination thereof. Illustratively, server 170 is shown as being associated with communications network 165. In certain embodiments, the communications network 165 may be part of a single autonomous system that is located in a particular geographic region, or be part of multiple autonomous systems that span several geographic regions.

The server 170 may be utilized to perform any of the operative functions supported by the communications network 165, the system 100, or a combination thereof. For example, the server 170 may be a routing engine/transaction server that may include similar functionality and capabilities as provided by transaction server 140 and routing engine 150, but may be utilized primarily for host vehicle 120. For example, the server 170 may determine routes for host vehicle 120, determine transactions associated with host vehicle 120, or a combination thereof. The server 170 may reside in communications network 165, however, in certain embodiments, the server 170 may reside outside of communications network 165. In certain embodiments, the server 170 may include a memory 171 that includes instructions, and a processor 172 that executes the instructions from the memory 171 to perform various operations that are performed by the server 170. The processor 172 may be hardware, software, or a combination thereof. In certain embodiments, the server 170 may be a network server, router, gateway, switch, media distribution hub, signal transfer point, service control point, service switching point, firewall, router, edge device, node, computer, mobile device, or any other suitable computing device, or any combination thereof. In certain embodiments, the server 170 be communicatively linked to the communications network 135, any network, any device in the system 100, or any combination thereof.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving information associated with an object 109 to be delivered to an intended destination 185; calculating routes for a drone 105 to deliver the object 109 to the intended destination 185; initiating, by utilizing the drone 105, delivery of the object 109 to the intended destination 185 by using the calculated routes; determining if a portion of a route associated with a host vehicle 120 corresponds with reaching the intended destination 185; causing the drone to piggyback with the host vehicle 120 during the portion of the route associated with the host vehicle 120; determining if the drone 105 needs to recharge and/or refuel; causing the drone 105 to deliver the object to the intended destination 185 based on the drone 105 piggybacking with the host vehicle 120; transmitting instructions to cause the drone 105 to dock at a drone nesting location 190; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

In certain embodiments, the server 160 may also serve as a drone manager for any number of drones 105. In serving as a drone manager, the server 160 may be configured to receive various types of information from server 150 (i.e. routing engine for communications network 135). Such information may include, but is not limited to, routes, such as piggybacking routes 212, for host vehicles 120 from the server 170 (transaction server/routing engine), routes 202 for drones 105, drone inventory information 204 (e.g. currently available drones, active drone information 206 identifying currently active or inactive drones nearby, total amount of drones in inventory, etc.), warehouse inventory information 210 (e.g. inventory information associated with object 109), third party drone information 208 identifying third party drones 105 that may be available for rent, drone recharging location information 214 (e.g. physical spots at which a drone may recharge), any other information, or any combination thereof. Additionally, the drone manager may receive drone battery information (e.g. current battery level and/or charge level) for any number of drones 105, drone lifespan information for any number of drones 105, location information for restocking drone 105 inventory, drone 105 cost information (e.g. how expensive a particular drone 105 is to operate, purchase, and/or recharge), delivery time information (e.g. time that the object 109 needs to be delivered by), or any combination thereof. Furthermore, the drone manager may receive information identifying a maximum amount of rerouting that is allowed for the drone 105 and/or host vehicle 120, costs for rerouting the drone 105 and/or the host vehicle 120, types of power sources 108 utilized by the drones 105, types of host vehicles 120 a particular drone 105 is compatible with for docking, and types of recharging power supplies needed to recharge drones 105. The drone manager may utilize any of the aforementioned information, along with any other information traversing the system 100 or otherwise, to determine and select the correct drone 105 to deliver the object 109 to the intended destination 185, determine the optimal route for the drone 105 to use while delivering the object 109, determine whether the drone 105 should piggyback with a host vehicle 120 or multiple host vehicles 120 on its way to the intended destination 185, or any combination thereof. Any of information received and/or generated by the drone manager may be transmitted to any devices and/or networks in the system 100.

Although FIGS. 1-3 illustrate specific example configurations of the various components of the system 100, the system 100 may include any configuration of the components, which may include using a greater or lesser number of the components. For example, the system 100 is illustratively shown as including a first user device 102, a second user device 111, a drone 105, an object 109, a host vehicle 120, a communications network 135, a communications network 165, a server 140, a server 145, a server 150, a server 160, a server 170, a database 155, and a drone nesting location 190. However, the system 100 may include multiple first user devices 102, multiple second user devices 111, multiple drones 105, multiple objects 109, multiple host vehicles 120, multiple communications networks 135, multiple communications networks 165, multiple servers 140, multiple servers 145, multiple servers 150, multiple servers 160, multiple servers 170, multiple databases 155, multiple drone nesting locations 190, or any number of any of the other components inside or outside the system 100. Furthermore, in certain embodiments, substantial portions of the functionality and operations of the system 100 may be performed by other networks and systems that may be connected to system 100.

Operatively, the system 100 may provide for drone 105 piggybacking on host vehicles 120, as shown in the following exemplary scenario. In the example scenario and referring to FIGS. 1-3, the first user 101 may transmit, by utilizing the first user device 102, a request to order a new smart watch, such as via an application executing on the first user device 102. The application may be associated with a manufacturer of the smart watch or a company that sells the smart watch on behalf of the manufacturer. Based on the request to order the new smart watch, the server 140 (i.e. transaction server) may process the transaction associated with the request, and the server 145 (i.e. the delivery engine) may obtain all the details associated with the order. For example, the server 145 may obtain information identifying the smart watch, the features of the smart watch, the dimensions and weight of the smart watch, the size of the package needed for transporting the smart watch, the name and address (intended destination 185) of the first user 101, when the smart watch needs to be delivered by, any other information, or a combination thereof. The server 145, the server 150 (i.e. the routing engine), and/or the server 160 (i.e. the drone manager) may analyze the information and determine various routes for delivering the smart watch to the first user 101.

The information analyzed may include, but is not limited to, piggybacking routes 212 for drones 105 to pair with host vehicles 120 provided by the server 170 (transaction server/routing engine), routes 202 for drones 105, drone inventory information 204 (e.g. currently available drones, active drone information 206 identifying currently active or inactive drones nearby, total amount of drones in inventory, etc.), warehouse inventory information 210 (e.g. inventory information associated with smart watch), third party drone information 208 identifying third party drones 105 that may be available for rent, drone recharging location information 214 (e.g. physical spots at which a drone 105 may recharge such as drone nesting locations 190), any other information, or any combination thereof. The analyzed information may be utilized by the system 100 to select the appropriate drone 105 (e.g. based on location, battery level, or other factors as described herein or otherwise) and determine an optimal route for the selected drone 105 to deliver the smart watch to the intended destination 185. The optimal route may indicate which host vehicles 120 that the selected drone 105 should piggyback with and when the selected drone 105 should piggyback with the host vehicles 120 while on its way to the intended destination 185. Once the drone 105 is selected and the optimal route is determined, the system 100 may transmit delivery instructions to the selected drone 105, such as by utilizing server 160 (i.e. the drone manager).

Upon receipt of the instructions or at another designated time, the selected drone 105 may leave a departure location 180 and begin traveling along the optimal route towards the intended destination 185. While traversing the optimal route, the drone 105 may piggyback with a host vehicle 120, such as shown in FIG. 3, and may optionally recharge a power source 108 of the drone 105 while piggybacking with the host vehicle 120. The drone 105 may piggyback with the host vehicle 120 for a duration specified by the system 100 and may detach from the host vehicle 120 at a time specified by the system. The drone 105 may proceed to piggyback with any number of additional host vehicles 120 while on its way to the intended destination 185 or simply continue to the intended destination 185 on its own. Once the drone 105 is at or near the intended destination 185, the drone 105 may deliver the smart watch to the first user 101 located at the intended destination 185. After delivering the smart watch, the drone 105 may receive instructions to land at a drone nesting location 190 and recharge the power source 108 using a charging port 192 of the drone nesting location 190. The drone 105 may then receive instructions from the system 100 to pick up additional ordered products, and the drone 105 may proceed to make deliveries to any number of other intended destinations 185 with the assistance of any number of host vehicles 120 traversing along any number of routes.

Notably, routes determined by the system 100 may be calculated and modified in real-time as traffic conditions change, host vehicles 120 change, host vehicle 120 routes change, weather conditions change, ordering information changes, intended destinations 185 change, any information changes, or any combination thereof. Additionally, any number of drones 105 may be utilized to make a delivery based on any number of factors, such as, but not limited to, a drone's 105 proximity to an intended destination 185, a drone's 105 power (e.g. battery) level, a drone's 105 weight, a drone's 105 speed capabilities, a drone's 105 carrying capacity, a drone's 105 dimensions, any other factor, or any combination thereof. Similarly, any number of host vehicles 120 may be utilized to assist a drone 105, and the host vehicles 120 may be selected based on the host vehicle's 120 speed, the host vehicle's 120 proximity to the drone 105 and/or intended destination 185 or other vantage point, the host vehicle's 120 physical features, the host vehicle's 120 dimensions, the host vehicle's 120 power supply, the host vehicle's 120 current or expected fuel reading, the host vehicle's 120 carrying capacity, traffic the host vehicle 120 is experiencing, any factor, or any combination thereof. Notably, any combination of drones 105, host vehicles 120, and routes may be utilized in the system 100.

Figure 4:
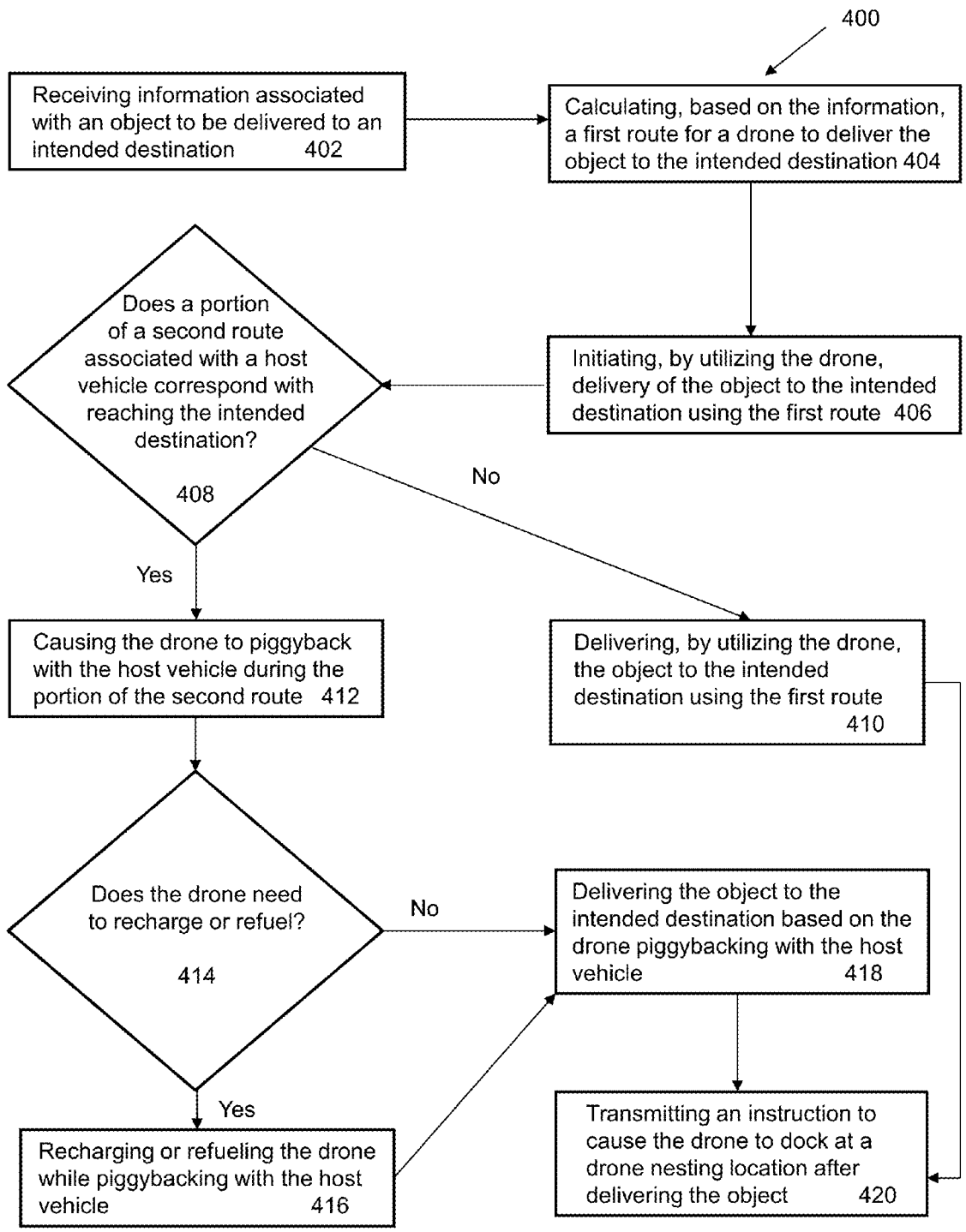
FIG. 4 is a flow diagram illustrating a sample method for providing drone piggybacking on host vehicles according to an embodiment of the present disclosure.

As shown in FIG. 4, an exemplary method 400 for providing drone piggybacking on host vehicles is schematically illustrated. The method 400 may include steps for enabling drones 105 and/or other unmanned mobile connected objects to piggyback onto various types of hosts, such as, but not limited to, vehicles as a means for transport, such as while delivering an ordered good to an intended destination 185. The method 400 may include, at step 402, receiving information associated with an object 109 that is to be delivered to an intended destination 185. For example, the first user 101 may utilize the first user device 102 to transmit an order to purchase a camera (i.e. the object 109 in this case), such as via an application executing on the first user device 102. The order details, such as the purchase price, promised delivery date, technical features of the camera, the size of the camera, the weight of the camera, the intended destination 185 for delivering the camera, or any combination thereof, may be received at step 402. In certain embodiments, the information associated with the object 109 may be received and/or transmitted by utilizing the first user device 102, the second user device 111, the drone 105, the host vehicle 120, the server 140, the server 145, the server 150, the server 160, the server 170, the communications network 135, the communications network 165, any combination thereof, or by utilizing any other appropriate program, network, system, or device.

At step 404, the method 400 may include calculating, based on the information received, a first route for a drone 105 to deliver the object 109 to the intended destination 185. In certain embodiments, the first route may be calculated based on the information received and based on global positioning data corresponding to the drone's 105 current location and global positioning data corresponding to the intended destination 185. In certain embodiments, the calculation of the route may be performed by utilizing the first user device 102, the second user device 111, the drone 105, the server 145, the server 150, the server 160, the server 170, the communications network 135, the communications network 165, any combination thereof, or by utilizing any other appropriate program, network, system, or device. Once the first route is calculated for the drone 105, the method 400 may include initiating, by utilizing the drone 105, the delivery of the object 109 to the intended destination 185 using the first route, at step 406. For example, a signal may be sent from the drone manager to the drone 105 to activate the drone 105 and cause the drone 105 to begin flying on the first route towards the intended destination 185. In certain embodiments, the first route may be calculated by utilizing the first user device 102, the second user device 111, the drone 105, the host vehicle 120, the server 145, the server 150, the server 160, the server 170, the communications network 135, the communications network 165, any combination thereof, or by utilizing any other appropriate program, network, system, or device.

At step 408, the method 400 may include determining whether a portion of a second route that is associated with a host vehicle 120 corresponds with reaching the intended destination 185. For example, if the portion of the second route that a host vehicle 120 is currently traveling on overlaps with a portion of the first route, corresponds with an alternate route for reaching the intended destination 185, corresponds with a more cost-effective route for reaching the intended destination 185 than traveling entirely on the first route, or a combination thereof, the portion of the second route may correspond with reaching the intended destination 185. The routing information for the second route may be obtained from global positioning data obtained from a global positioning sensor of the host vehicle 120, from the routing engine/transaction server 170, from images taken from satellites or cameras of the routes, from video content taken of the host vehicle 120 while traversing the second route, or a combination thereof. In certain embodiments, the determining may be performed by utilizing the first user device 102, the second user device 111, the drone 105, the host vehicle 120, the server 140, the server 145, the server 150, the server 160, the server 170, the communications network 135, the communications network 165, any combination thereof, or by utilizing any other appropriate program, network, system, or device.

If the portion of the second route that is associated with the host vehicle 120 is determined to not correspond with reaching the intended destination 185, the method 400 may include causing the drone 105 to deliver the object 109 by continuing on the first route, at step 410. Using the previous example, the system 100 may transmit a signal to the drone 105 to continue on its path on the first route until the drone 105 reaches the intended destination 185 and is able to drop off the camera to the first user 101. If, however, the portion of the second route that is associated with the host vehicle 120 is determined to correspond with reaching the intended destination 185, the method 400 may include, at step 412, causing the drone 105 to piggyback with the host vehicle 120 during at least the portion of the second route that corresponds with reaching the intended destination 185. For example, the drone 105 may piggyback with the host vehicle 120 by landing on and affixing itself to the dock 123 of the host vehicle 120 during the portion of the second route. In certain embodiments, the instructions to cause the drone 105 to piggyback with the host vehicle 120 may be transmitted by utilizing the first user device 102, the second user device 111, the drone 105, the host vehicle 120, the server 145, the server 150, the server 160, the server 170, the communications network 135, the communications network 165, any combination thereof, or by utilizing any other appropriate program, network, system, or device.

At step 414, the method 400 may include determining if the drone 105 needs to recharge and/or refuel. For example, if a battery level of a battery (e.g. power source 108) of the drone 105 is below a certain threshold, the drone's 105 battery may need to be recharged. Similarly, if a fuel level of a fuel tank of the drone 105 is below a certain threshold, the drone's 105 fuel tank may need to be recharged. In certain embodiments, the determination may be performed by utilizing the first user device 102, the second user device 111, the drone 105, the host vehicle 120, the server 145, the server 150, the server 160, the server 170, the communications network 135, the communications network 165, any combination thereof, or by utilizing any other appropriate program, network, system, or device. If the drone 105 does not need to recharge or refuel, the method 400 may include proceeding to step 418, which may include delivering the object 109 to the intended destination 185 based on the drone 105 piggybacking with the host vehicle 120 for at least the portion of the second route that corresponds with reaching to the intended destination 185. Using the previous example, the camera may be delivered to the first user's 101 home, which may be the intended destination 185.

If, however, the drone 105 does need to be recharged and/or refueled, the method 400 may include, at step 416, recharging and/or refueling the drone 105 while the drone 105 is piggybacking with the host vehicle 120. For example, while the drone 105 is docked with the dock 123 of the host vehicle 120, a power supply of the host vehicle 120 may be utilized to charge the battery of the drone 105. In certain embodiments, the recharging and/or refueling may be performed by utilizing the drone 105, the host vehicle 120, any combination thereof, or by utilizing any other appropriate program, network, system, or device. As the drone 105 is being recharged and/or refueled, the method 400 may proceed to step 418, which includes delivering the object 109 carried by the drone 105 to the intended destination 185. For example, at step 418, the method 400 may include having the drone 105 deliver the object 109 to the intended destination 185 based on the drone 105 piggybacking with the host vehicle 120 for at least the portion of the second route that corresponds with reaching to the intended destination 185. In certain embodiments, the drone 105 may detach from the host vehicle 120 after piggybacking during the portion of the second route, and proceed along a remaining portion of the first route or along an alternate route to the intended destination 185 so as to deliver the object 109 to the intended destination 185. In certain embodiments, the host vehicle 120 may drive the drone 105 all the way to the intended destination 185, at step 418, so as to deliver the object 109 to the intended destination 185. In certain embodiments, the object 109 may be delivered by utilizing the first user device 102, the second user device 111, the drone 105, the host vehicle 120, the server 145, the server 150, the server 160, the server 170, the communications network 135, the communications network 165, any combination thereof, or by utilizing any other appropriate program, network, system, or device.

Once the object 109 is delivered to the intended destination 185, the method 400 may include transmitting an instruction to the drone 105 to cause the drone 105 to dock at a drone nesting location 190, at step 420. In certain embodiments, the instruction may be transmitted by utilizing the first user device 102, the second user device 111, the drone 105, the host vehicle 120, the server 145, the server 150, the server 160, the server 170, the communications network 135, the communications network 165, any combination thereof, or by utilizing any other appropriate program, network, system, or device. In certain embodiments, the drone 105 may dock on a charging port 192 of the drone nesting location 190 so as to recharge the power source 108 of the drone 105. The method 400 may repeated as necessary, such as when new orders for new objects 109 are received by the system 100. Notably, the method 400 may further incorporate any of the features and functionality described for the system 100 or as otherwise described herein.

The systems and methods disclosed herein may include additional functionality and features. For example, based on the functionality provided by the systems and methods, the required traveling range for a typical drone 105 may be reduced when a drone 105 piggybacks on a host vehicle 120. Additionally, the systems and methods allow for larger packages (objects 109) to be delivered because less power may be consumed by the drone 105 if the drone 105 piggybacks with a host vehicle 120 when delivering a package. Furthermore, cheaper and smaller drones 105 may be utilized based on the drone's 105 being able to piggyback with a host vehicle 120. In certain embodiments, various sellers of products may be able to suggestively sell various items of interest in an "instant gratification" model. For example, based on the information traversing the system 100, the system 100 may indicate that several users (e.g. first and second users 101, 110) happen to be ordering the same product to be delivered within the same five-mile radius traveled by a drone 105 and/or host vehicle 120. Based on the information, the system 100 may transmit a notification to a seller advising of the orders and the area encompassing the five-mile radius. Based on the notification, the seller may transmit a notification to various users having accounts with the seller to suggest purchasing the same product, perhaps with a discount because drones 105 and/or host vehicles 120 are in the area.

In certain embodiments, the systems and methods may enable sellers to partner with providers of various delivery channels based on location. For example, using the example above, a seller may transmit a notification to various users in the five-mile radius that have accounts with the seller to suggest a purchase. The notification may be for the same product that other purchasers in the five-mile radius purchased or for any other product. If the providers of the various delivery channels associated with the five-mile radius are partnered with the seller, the seller may readily utilize any drones 105 and/or host vehicles 120 of the providers to deliver products to intended destinations 185 in the five-mile radius. In certain embodiments, the systems and methods may enable sellers and couriers to use predicted orders for delivery to assist in planning efficient routes. For example, based on purchase history information for a specific region, a seller may predict that a certain number of orders for a new version of a product may come from the region. Based on the predicted number of orders for the specific region, the systems and methods may preselect efficient routes for the drones 105 and/or host vehicles 120 to travel to various intended destinations 185 in the specific region.

In certain embodiments, the systems and methods may also be utilized to optimize a route to an intended destination 185 based on previous deliveries. For example, if the first user 101 previously had a product delivered at his house and the system 100 utilized a certain route that involved having the drone 105 fly for one-third of the route and piggyback with a host vehicle 120 for two-thirds of the route, the system 100 may determine that on a subsequent order that an entirely different route should be utilized that involves having the drone 105 fly for one-tenth of the different route and piggyback with one or more host vehicles 120 for the remaining nine-tenths of the different route. As another example, on a subsequent order the system 100 may determine that a previously-used route currently contains too much traffic based on real-time images received from cameras positioned along the previously-used route, based on global positioning data, based on satellite data feeds, or a combination thereof. Based on the foregoing, the system 100 may calculate a new route for the drone 105 to travel to the first user's 101 intended destination 185, and may determine which specific host vehicles 120 the drone 105 should piggyback with and when the drone 105 should piggyback with the specific host vehicles 120.

The systems and methods may also be utilized to make more efficient deliveries to third parties, such as third parties who share their current and predicted future location information. As an example, if the first user 101 ordered a product and wants the product to be delivered in a certain area in Atlanta, the system 100 may determine that a second user 110 who is sharing their location via a mobile device is located in Atlanta (or is expected to be in Atlanta based on a current trajectory provided by the mobile device of the second user 110) as well. The system 100 may transmit a signal to the drone 105 to not only pickup and deliver the first user's 101 product, but also to pick up and deliver a product ordered by the second user 110 because the second user 110 is in or will be in the same location (or proximate location) as the first user 101. As a result, two deliveries may be made to two different users in a more efficient manner.

As another example involving third parties, if a particular company has a fleet of drones 105 and/or host vehicles 120, the company may rent additional drones 105 and/or host vehicles 120 from a third party so as to ensure all deliveries may be made on time and that enough resources are available. For example, based on third party drone information 208, the system 100 may identify a specific quantity of third party drones 105 that may be available for rent during a busy-ordering season. The specific quantity of third party drones 105 may be added to the system 100 for a selected period of time that is agreed upon with the third party. As a further example involving third parties, a third party, such as a hospital, may utilize a computing device to transmit a request to the system 100 to have a drone 105 and/or host vehicle 120 transport blood containers or other medical supplies to another hospital for delivery to a patient in need. For example, if a drone 105 has just finished delivering a camera to the first user 101, the drone 105 may receive information from the system 100 indicating that the drone 105 should travel to a first hospital to pick up a certain medical drug for delivery to a second hospital instead of having the drone 105 return to a drone nesting location 190 (or departure location 180) after delivering the camera to the first user 101.

In certain embodiments, a host vehicle 120 and/or an entity (e.g. company or individual) associated with the host vehicle 120 may be given incentives if the host vehicle 120 allows a drone 105 to piggyback with the host vehicle 120. For example, the host vehicle and/or associated entity may receive incentives such as, but not limited to, monetary compensation, coupons for various goods and/or services, increased bandwidth for network services associated with the host vehicle 120 and/or entity, higher-tier network services for the host vehicle 120 and/or entity, free advertising for the host vehicle 120 and/or entity, discounted fuel, discounted rates for electric charging (e.g. such as charging needed for the host vehicle 120 if the host vehicle 120 is an electric vehicle or hybrid vehicle), any type of incentive, or any combination thereof. In certain embodiments, the host vehicle 120 and/or entity associated with the host vehicle may receive payments, such as micropayments, as soon as a drone 105 is done piggybacking with the host vehicle 120. In some embodiments, the host vehicle 120 and/or entity may be paid in real-time as the host vehicle 120 is carrying a drone 105. For example, for each mile that a host vehicle 120 travels while carrying a drone 105, the host vehicle 120 and/or entity may be paid a certain monetary sum for each mile as each mile is traversed by the host vehicle 120. Also, in some embodiments, a host vehicle 120 may be given greater incentives (e.g. financial compensation) if vehicular traffic or other traffic in a given area is congested beyond a threshold amount. Notably, any type of mutually beneficial arrangement may be made with the host vehicle 120 and/or the entity associated with the host vehicle 120.

In certain embodiments, the systems and methods may provide for user-to-user drone delivery services. In an example scenario, the first user 101 may be the brother of second user 110. The first user 101 may have ordered a new computer for delivery, and a drone 105 may be on its way to deliver the ordered computer to the first user 101. The first user 101 may subscribe to the services of the system 100 and may transmit a request to the system 100 (such as by utilizing first user device 102) indicating that the first user 101 wants to have the drone 105 pick up the first user's 101 old computer after delivering the new computer to the first user 101. The request may identify the dimensions of the old computer, the model number, the location of the old computer, and/or any other information related to the old computer. Additionally, the request may specify that the old computer is to be picked up by the drone 105 and delivered to the second user 110. In response to the request, the system 100 may transmit a signal to the drone 105 to pick up the old computer at the location specified by the first user 101, and the drone 105 may proceed to deliver the old computer to the second user 110 at a location specified by the first user 101.

In certain embodiments, the drone nesting locations 190 may be placed at or near locations that have been determined by the system 100 to be associated with large amounts of purchases. For example, if Atlanta is determined to have a much higher level of orders for products than surrounding cities' level of orders, then one or more drone nesting locations 190 may be placed at or near Atlanta so as to ensure that a greater number of drones 105 are closer to the intended destinations 185 that are associated with the higher level of orders. In certain embodiments, if a location has a threshold average number of orders for a selected period of time, the system 100 may determine that a drone nesting location 190 should be placed at or near the location. By having drone nesting locations 190 positioned closer to areas of high-volume orders, the drones 105 may expend even less power to delivery objects 109. In certain embodiments, the drone nesting locations 190 may be located in proximity to facilities that manufacture or store ordered products or in proximity to any other desired location. Additionally, each drone nesting location 190 may include any number of charging ports 192 for any number of drones 105. Furthermore, in certain embodiments, a drone nesting location 190 may be able to charge fees (or obtain some type of incentive) if a drone 105 nests at the drone nesting location and/or the drone 105 charges on a charging port 192.

The systems and methods may be particularly useful when faced with restrictions set by Federal Aviation Administration (FAA) rules, by local ordinances, by laws, or by any combination thereof. For example, if a FAA rule indicates that drones 105 may not fly in certain remote areas and that the drones 105 may only fly in a local area, a drone nesting location 190 may be placed in the local area and the system 100 may transmit instructions to any drones 105 to only travel and/or deliver objects 109 within the local area and to not leave the local area. If a drone 105 needs to leave the local area, the system 100 may transmit an instruction to the drone 105 to piggyback with a host vehicle 120 so as to exit out of the local area and enter into a restricted area. As another example, if a local ordinance prevents drones 105 from being no farther than twenty feet from certain roads or highways, the drone 105 may piggyback with one or more host vehicles 120 to reach intended destinations 185 that are beyond the twenty feet restriction. As a further example, if a law indicates that no more than ten drones 105 may be flying in a particular area for a particular time, any extra drones 105 may piggyback with any number of host vehicles 120 to either leave the area or enter into a new area. Notably, the piggybacking capabilities may be utilized to assist with dealing with any types of restrictions.

In further embodiments, the systems and methods may include partnering the system 100 with networks associated with autonomous vehicles or non-autonomous vehicles. For example, the system 100 may partner with a taxi service that utilizes software applications to connect users with taxis. In such a scenario, the taxi service may share routes traversed by the taxis (i.e. host vehicles 120) with the system 100, and the system 100 may determine which taxis should serve as host vehicles 120 for which drones 105 and in which areas. The taxi service may also share direction information that indicates the direction a taxi is facing or heading towards. Based on such information, the system 100 may determine that multiple taxis should serve as host vehicles 120 for a drone 105 during a trip taken by a drone 105. The routes for the drones 105 may be optimized based on having the information for the taxis, and the taxis may be given incentives for allowing drones 105 to piggyback with the taxis. Similar partnerships may be made with individual users, train services, airplane services, boating services, trucking services, any type of vehicles services, or any combination thereof.

Figure 5:
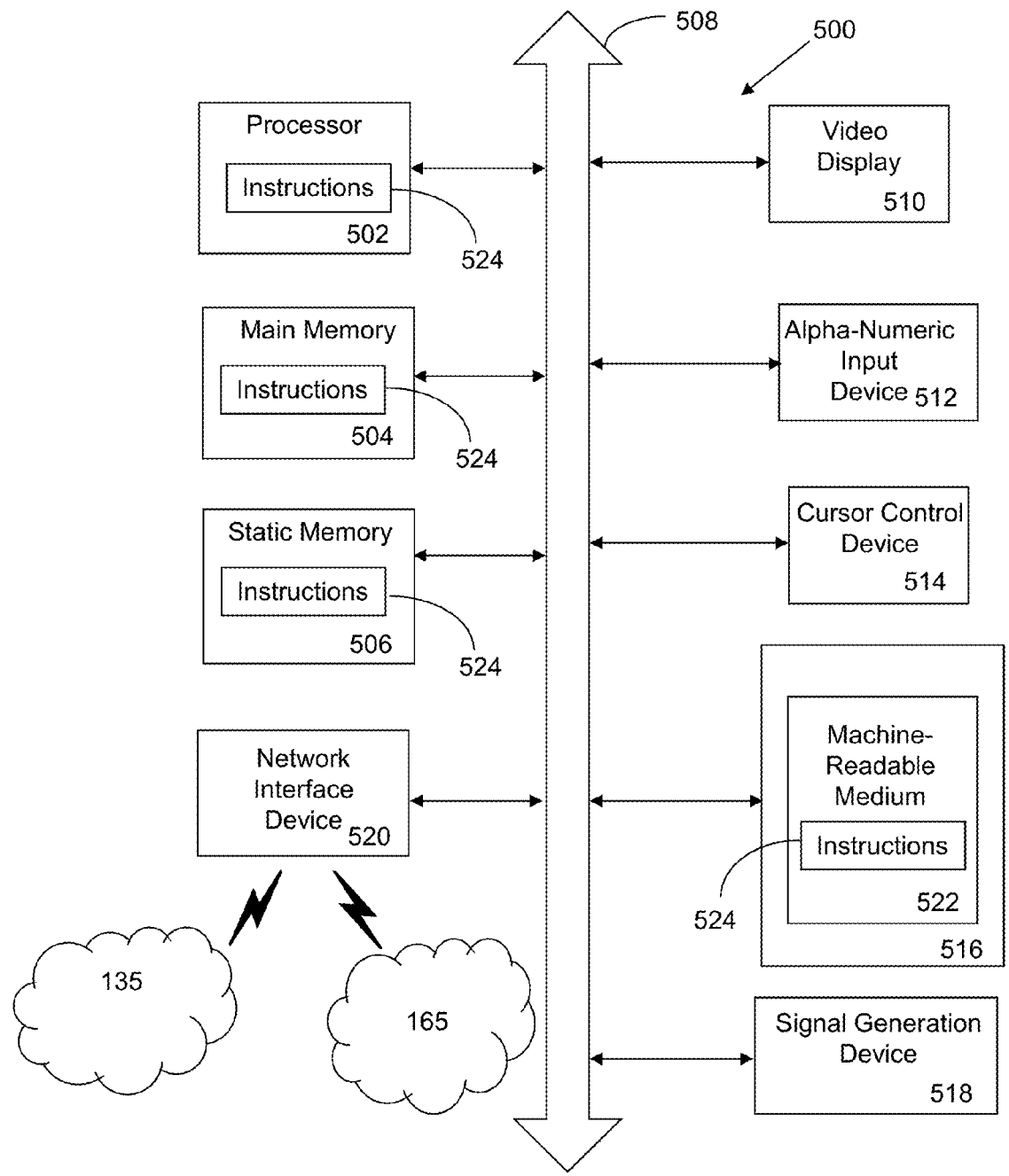
FIG. 5 is a schematic diagram of a machine in the form of a computer system within which a set of instructions, when executed, may cause the machine to perform any one or more of the methodologies or operations of the systems and methods for providing drone piggybacking on host vehicles.

Referring now also to FIG. 5, at least a portion of the methodologies and techniques described with respect to the exemplary embodiments of the system 100 can incorporate a machine, such as, but not limited to, computer system 500, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, communications network 165, another network, or a combination thereof) to and assist with operations performed by other machines and systems, such as, but not limited to, the first user device 102, the second user device 111, the drone 105, the host vehicle 120, the server 140, the server 145, the server 150, the database 155, the server 160, the server 170, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510, which may be, but is not limited to, a liquid crystal display (LCD), a flat panel, a solid state display, or a cathode ray tube (CRT). The computer system 500 may include an input device 512, such as, but not limited to, a keyboard, a cursor control device 514, such as, but not limited to, a mouse, a disk drive unit 516, a signal generation device 518, such as, but not limited to, a speaker or remote control, and a network interface device 520.

The disk drive unit 516 may include a machine-readable medium 522 on which is stored one or more sets of instructions 524, such as, but not limited to, software embodying any one or more of the methodologies or functions described herein, including those methods illustrated above. The instructions 524 may also reside, completely or at least partially, within the main memory 504, the static memory 506, or within the processor 502, or a combination thereof, during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 522 containing instructions 524 so that a device connected to the communications network 135, communications network 165, another network, or a combination thereof, can send or receive voice, video or data, and communicate over the communications network 135, communications network 165, another network, or a combination thereof, using the instructions. The instructions 524 may further be transmitted or received over the communications network 135, communications network 165, another network, or a combination thereof, via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions;
a processor that executes the instructions to perform operations, the operations comprising:
receiving information associated with an object to be delivered to an intended destination;
calculating, based on the information, a first route for a drone to deliver the object to the intended destination;
initiating, by utilizing the drone, delivery of the object to the intended destination using the first route;
determining whether a portion of a second route associated with a host vehicle corresponds with reaching the intended destination;
causing, if the portion of the second route associated with the host vehicle corresponds with reaching the intended destination, the drone to piggyback with the host vehicle during the portion of the second route; and
delivering, based on the drone piggybacking with the host vehicle during the portion of the second route, the object to the intended destination.

2. The system of claim 1, wherein the operations further comprise causing the drone to connect to a charging device of the host vehicle when the drone piggybacks with the host vehicle.

3. The system of claim 2, wherein the operations further comprise charging a power source of the drone by utilizing the charging device of the host vehicle.

4. The system of claim 1, wherein the operations further comprise determining whether a threshold amount of congestion exists on the portion of the second route.

5. The system of claim 4, wherein the operations further comprise delivering, if the threshold amount of congestion exists on the portion of the second route, the object to the intended destination without having the drone piggyback with the host vehicle.

6. The system of claim 1, wherein the operations further comprise transmitting an instruction to the drone to cause the drone to land at a drone nesting location after delivering the object to the intended destination.

7. The system of claim 1, wherein the operations further comprise selecting the drone from a drone inventory based on a battery level associated with the drone.

8. The system of claim 1, wherein the operations further comprise selecting the drone based on a proximity of the drone to the intended destination.

9. The system of claim 1, wherein the operations further comprise causing the drone to detach from the host vehicle if the host vehicle veers off the second route by a maximum threshold distance.

10. The system of claim 9, wherein the operations further comprise causing, if the host vehicle veers off the second route by the maximum threshold distance, the drone to piggyback to a different host vehicle associated with a third route corresponding to the intended destination.

11. The system of claim 1, wherein the operations further comprise receiving the information associated with the object, wherein the information comprises a weight of the object, a delivery time required for delivering the object, a dimension of the object, an identification of the object, or a combination thereof.

12. The system of claim 1, wherein the operations further comprise receiving a request from a user to deliver a different object at a different intended destination.

13. The system of claim 12, wherein the operations further comprise calculating a third route for delivering the different object at the different intended destination, and wherein the operations further comprise delivering the different object at the different intended destination using the third route.

14. A method, comprising:
receiving information associated with an object to be delivered to an intended destination;
determining, based on the information, a first route for a drone to deliver the object to the intended destination;
initiating, by utilizing the drone, delivery of the object to the intended destination using the first route;
determining, by utilizing instructions from a memory that are executed by a processor, whether a portion of a second route associated with a host vehicle overlaps with a corresponding portion of the first route;
causing, if the portion of the second route associated with the host vehicle is determined to overlap with the corresponding portion of the first route, the drone to piggyback with the host vehicle during the portion of the second route; and
delivering, based on the drone piggybacking with the host vehicle during the portion of the second route, the object to the intended destination.

15. The method of claim 14, further comprising determining a first congestion level for the portion of the second route and a second congestion level for the corresponding portion of the first route.

16. The method of claim 15, further comprising not causing the drone to piggyback with the host vehicle if the first congestion level is greater than the second congestion level, and further comprising delivering, based on only the first route, the object to the intended destination.

17. The method of claim 14, further comprising causing the drone to connect to a charging device of the host vehicle when the drone piggybacks with the host vehicle.

18. The method of claim 17, further comprising charging a power source of the drone by utilizing the charging device of the host vehicle.

19. The method of claim 14, further comprising causing the drone to piggyback with the host vehicle if the drone enters a blacked out region while on the first route.

20. A computer-readable device comprising instructions, which when executed by a processor, cause the processor to perform operations comprising:
calculating, based on information received for an object, a first route for a drone to deliver the object to an intended destination;
initiating, by utilizing the drone, delivery of the object to the intended destination using the first route;
determining whether a portion of a second route associated with a host vehicle corresponds with reaching the intended destination;
causing, if the portion of the second route associated with the host vehicle corresponds with reaching the intended destination, the drone to piggyback with the host vehicle during the portion of the second route; and
delivering, based on the drone piggybacking with the host vehicle during the portion of the second route, the object to the intended destination.

* * * * *